United States Patent
Moradmand et al.

(10) Patent No.: US 6,655,512 B2
(45) Date of Patent: Dec. 2, 2003

(54) VARIABLE AREA LOW SPEED ORIFICE IN A VEHICLE DAMPER

(75) Inventors: Jamshid K. Moradmand, Dayton, OH (US); Marcin Knapczyk, Krakow (PL); Robert A. Neal, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/029,455

(22) Filed: Dec. 20, 2001

(65) Prior Publication Data

US 2002/0096408 A1 Jul. 25, 2002

Related U.S. Application Data

(60) Provisional application No. 60/256,767, filed on Dec. 19, 2000.

(51) Int. Cl.[7] ................................................ F16F 9/348
(52) U.S. Cl. ........................... 188/282.5; 188/322.15
(58) Field of Search ........................ 188/282.5, 282.6, 188/322.15, 322.22, 317, 320, 322.13

(56) References Cited

U.S. PATENT DOCUMENTS

| | | | | | |
|---|---|---|---|---|---|
| 3,113,644 | A | * | 12/1963 | Wossner | 188/282.5 |
| 3,621,951 | A | * | 11/1971 | Schmid | 188/282.5 |
| 4,721,130 | A | * | 1/1988 | Hayashi | 137/512.15 |
| 4,972,929 | A | * | 11/1990 | Ivers et al. | 188/322.15 |
| 5,042,624 | A | * | 8/1991 | Furuya et al. | 188/280 |
| 5,261,448 | A | * | 11/1993 | Furuya et al. | 137/513.5 |
| 5,316,113 | A | * | 5/1994 | Yamaoka | 188/282.6 |
| 5,529,154 | A | * | 6/1996 | Tanaka | 188/282.6 |
| 5,823,306 | A | * | 10/1998 | de Molina | 188/322.15 |
| 6,116,388 | A | * | 9/2000 | Bataille et al. | 188/282.6 |
| 6,247,563 | B1 | * | 6/2001 | De Carbon et al. | 188/282.5 |
| 6,276,499 | B1 | * | 8/2001 | Satou | 188/322.15 |
| 6,427,812 | B2 | * | 8/2002 | Crawley et al. | 188/266.7 |

\* cited by examiner

*Primary Examiner*—Jack Lavinder
*Assistant Examiner*—Benjamin A Pezzlo
(74) *Attorney, Agent, or Firm*—Scott A. McBain

(57) ABSTRACT

A vehicle damper includes a valve having of an imperforate, deflectable variable orifice disk with an outer periphery that is only partially clamped against a valve seat, during low velocity operation of the damper, by a variable orifice support disk having an outer periphery that is not coextensive with the outer periphery of the variable orifice disk. The portion of the outer periphery of the variable orifice disk that is not clamped against the valve seat deflects away from the valve seat during low velocity operation of the damper, in response to force on the variable orifice plate generated by pressure of fluid in flow apertures closed off by the variable orifice plate, to provide a variable orifice for fluid flow through the valve and digressive performance of the damper. The valve may take the form of a compression or rebound valve on the piston of the vehicle damper, or a base valve in a dual tube damper. The valve may take the form of a blow-off valve, a deflecting disk valve, a combination blow-off deflecting disk valve, or as part of other types of valves suited for use in vehicle dampers. A vehicle damper may include one or more variable orifice area low velocity valves in combination with other valves of conventional construction.

3 Claims, 6 Drawing Sheets

(DESIRED)

VARIABLE AREA LOW SPEED ORIFICE IN A VEHICLE DAMPER

RELATED APPLICATIONS

This application claims priority to U.S. Patent Application Serial No. 60/256,767 filed on Dec. 19, 2000 entitled "VARIABLE AREA LOW SPEED ORIFICE" by Jamshid K. Moradmand, et al, the entire disclosure of which is incorporated by reference, herein.

TECHNICAL FIELD OF THE INVENTION

This invention relates to a damper adapted for use in a vehicle suspension system, and more particularly to a vehicle damper providing digressive force versus velocity performance at low damper velocities.

BACKGROUND OF THE INVENTION

A hydraulic damper used in a vehicle suspension system, such as a shock absorber or a MacPherson strut, must be capable of reacting to and dissipating energy under all types of driving conditions and road obstacles that the vehicle may encounter. The vehicle damper must be capable of handling low velocity inputs, such as chassis sway, encountered during normal maneuvering of the vehicle, and high velocity inputs when the wheels of the vehicle encounter bumps or potholes in the road surface.

In order to accommodate both low and high velocity movements of the suspension, vehicle dampers often include one or more valves having a notched orifice disk, of the type illustrated in FIG. 1. Under low velocity input conditions, the orifice disk is clamped against a valve seat to close off flow apertures within the damper that allow passage of fluid through the internal components of the damper. When a high velocity input to the damper is encountered, fluid in the flow apertures reaches a pressure that is high enough to force all or a portion of the orifice disk off of the valve seat, thereby allowing the internal components of the damper to move through the fluid and provide high velocity damping of the suspension. The orifice disk may be part of a blow-off valve assembly, where the orifice disk is held against the valve seat by a spring, until the pressure in the flow apertures increases to an opening pressure at which force, generated by the fluid pressure in the flow apertures acting against the orifice disk, compresses the spring, and the entire orifice disk lifts off of the valve seat to provide a large effective orifice area for the passage of fluid during dissipation of the high velocity input by the damper. Alternatively, the orifice disk may be part of a deflecting disk valve, where the central portion of the disk remains clamped to the valve seat, and the outer periphery of the orifice disk flexes away from the valve seat to allow passage of fluid during high velocity inputs to the damper, when the fluid pressure in the flow apertures acting on the orifice disk reaches a pressure high enough to cause the disk to deflect.

During low velocity input conditions, the orifice disk remains clamped against the valve seat, and fluid in the flow apertures is allowed to bleed through the notches in the outer periphery of the orifice disk. The low speed performance of the damper can be tuned fairly accurately by judicious selection of the size and number of notches in the orifice disk, and the thickness of the orifice disk.

Valves having notched orifice disks, as described above, provide a fixed area effective orifice during low velocity operation of the damper. Such a fixed area orifice allows fluid to flow through the notches during low speed operation of the damper in such a manner that the force generated by the damper is a generally parabolic function of velocity of the input, as depicted in the low velocity portion 'A' of the operating curve illustrated in FIG. 2. When the opening pressure 'B' of the valve is reached, the orifice disk blows off or deflects away from the valve seat, thereby increasing the effective orifice area significantly, and the operating characteristic of the damper changes to a linear or much flatter partially parabolic relationship during high velocity operation, as shown by the high velocity portion 'C' of the operating curve illustrated in FIG. 2.

The parabolic shaped, low velocity operating characteristic provided by valves having fixed area orifice disks is not ideal for all suspension systems, however. In some suspension systems, it is desirable to have a vehicle damper that provides a force versus velocity operating characteristic during low velocity inputs that digresses, as shown in FIG. 3, from the parabolic shape provided by fixed area orifice plates of the type used in prior vehicle dampers, and described above.

What is needed, therefore, is an improved valve assembly and vehicle damper that provides a digressive operating characteristic for damping low velocity inputs to the damper. Preferably, the improved valve assembly can be configured alternatively in the form of a blow-off valve, a clamped deflecting disk valve, or in a valve combining both deflecting disk and blow-off functions. It is also desirable that the improved valve be capable of use in various forms as a compression or a rebound valve on the piston of a vehicle damper, or as a base valve in a dual tube vehicle damper.

SUMMARY OF THE INVENTION

Our invention provides such an improved valve and vehicle damper through the use of an imperforate and deflectable, variable orifice disk, having an outer periphery that is only partially clamped against a valve seat, during low velocity operation of the damper, by a variable orifice support disk that has an outer periphery which is not coextensive with the outer periphery of the variable orifice disk. The portion of the outer periphery of the variable orifice disk that is not clamped against the valve seat deflects away from the valve seat during low velocity operation of the damper, in response to force on the variable orifice plate generated by pressure of fluid in flow apertures closed off by the variable orifice plate, to provide a variable orifice for fluid flow through the valve and digressive performance of the damper.

Our invention may take the form of a compression or rebound valve on the piston of a vehicle damper, or a base valve in a dual tube damper. Our invention may take the form of a blow-off valve, a deflecting disk valve, a combination blow-off deflecting disk valve, or as part of other types of valves suited for use in vehicle dampers. A damper according to our invention may include one or more valves according to our invention in combination with other valves of conventional construction.

In one form of our invention, a valve assembly for a vehicle damper includes a valve seat, and orifice disk means. The valve seat defines a flow aperture adapted for receiving a fluid and directing a flow of the fluid through the valve seat. The orifice disk means are adapted for sealing engagement with the valve seat to block the flow of fluid through the flow aperture until the fluid in the flow aperture reaches an opening pressure of the valve, with the orifice disk means providing a variable orifice area for a flow of fluid through the valve prior to the fluid in the flow aperture reaching the opening pressure of the valve. The variable orifice area of the valve allows a flow of fluid through the valve, prior to the fluid in the flow aperture reaching the opening pressure of the valve, that digresses from a parabolic force versus flow characteristic of the type produced by a constant area bleed orifice.

The orifice disk means may include a variable area orifice disk that is partly deflectable away from the valve seat by fluid pressure in the flow aperture acting against the orifice disk when it is in sealing engagement with the valve seat. The deflected disk forms a flow area through the valve that varies in accordance with the pressure of the fluid in the flow apertures prior to the fluid in the flow aperture reaching the opening pressure of the valve.

The flexible orifice disk may have an outer periphery adapted for clamped engagement against the valve seat, and for blocking the flow aperture when the outer periphery of the flexible orifice disk is not deflected away from the valve seat, with the support disk being adapted for clamping less than the entire outer periphery of the flexible orifice against the valve seat. The support disk is shaped for providing only partial clamping and support of the flexible orifice disk against the valve seat, such that fluid pressure within the flow aperture causes localized deflection in a direction away from the valve seat of an unsupported portion of the outer periphery the flexible orifice disk. The deflected unsupported portion of the flexible orifice disk, and a portion of the valve seat adjacent to the deflected portion of the orifice disk, define a bleed orifice having an area for bleed flow through the valve that is variable in accordance with the pressure of the fluid in the flow aperture prior to the fluid in the flow aperture reaching the opening pressure of the valve. The flexible orifice disk may include a non-flexing portion thereof that remains clamped against the valve seat after the opening pressure is achieved.

The valve may also be configured such that the flexible orifice disk lifts away from the valve seat when the operating pressure is reached.

Our invention may also take the form of a vehicle damper including a cylinder tube defining a working chamber for containing a fluid therein and defining an axis. A reciprocating piston slidably disposed in the working chamber includes a first and a second face and a flow aperture extending through the piston from the first to the second face. The vehicle damper includes a piston rod having a first and a second end, with the first end being connected to the piston for linear movement of the rod and piston within the working chamber along the axis, and the second end of the piston rod extending along the axis and out of the working chamber. A valve assembly of the vehicle damper includes a valve seat oriented substantially perpendicularly to the axis and defining a pressure cavity in communication with the flow aperture extending through the piston. A flexible orifice disk of the valve has an outer periphery adapted for clamped engagement against the valve seat, and for blocking the flow aperture when the outer periphery of the flexible orifice disk is not deflected away from the valve seat. A support disk is adapted for clamping less than the entire outer periphery of the flexible orifice against the valve seat. The support disk is shaped for providing support of the flexible orifice disk against the valve seat such that fluid pressure within the pressure cavity causes localized deflection in a direction away from the valve seat of an unsupported portion of the outer periphery the flexible orifice disk. The deflected unsupported portion of the flexible orifice disk, and a portion of the valve seat adjacent to the deflected portion of the orifice disk, define a bleed orifice having an area for bleed flow through the valve that is variable in accordance with the pressure of the fluid in the pressure cavity prior to the fluid in the pressure cavity reaching the opening pressure of the valve.

The variable orifice disk in the vehicle damper may include a non-flexing portion thereof that remains clamped against the valve seat after the opening pressure is achieved. Alternatively, the variable orifice disk may lift away from the valve seat when the operating pressure is reached.

The vehicle damper may include a spring seat adapted for movement along the axis and for clamping the variable orifice disk between the support disk and the valve seat, and a spring for preloading the spring seat, support disk and the variable orifice disk against the valve seat. The spring may be a low rate high preload spring. The spring may have a spring rate in the range of 20 to 60 Newtons per millimeter, and a preload in the range of 100 to 500 Newtons. The spring seat may include a radially extending flange extending generally perpendicularly to the axis and adapted for bearing against the support disk.

The vehicle damper may further include a bushing extending from the valve seat along the axis, the bushing including a guide surface, for guiding the spring seat, support disk and the orifice disk along the axis, and a spring retainer for clamping the spring against the spring seat and the bushing against the valve seat. The guide surface of the bushing may extend past the variable orifice disk when the bushing is clamped between the spring retainer and the valve seat, and the valve seat may include a piloting recess for receiving the portion of the bushing extending past the variable orifice disk when the variable orifice disk is clamped against the valve seat, so that the bushing limits the preload on the spring, and the portion of the bushing extending past the orifice disk, and the piloting recess facilitates assembly of the vehicle damper by precluding the orifice disk from being inadvertently clamped between the bushing and the valve seat.

The portion of the bushing extending past the variable orifice disk may terminate in means for precluding the variable orifice disk from separating from the bushing prior to the bushing contacting the piloting recess in the valve seat. The guide surface of the bushing may be a right circular cylinder concentric with the axis and the means for precluding the variable orifice disk from separating from the bushing may be a radially extending cylindrical pilot, with the piloting recess in the valve seat being configured for receiving and positioning the cylindrical pilot radially and axially with respect to the axis and the valve seat.

In some forms of our invention the valve seat may be formed by a face of the piston in the vehicle damper.

Our invention may be practiced in any form of a vehicle damper that includes a valve having a variable area orifice for low velocity operation of the damper.

Our invention may also take the form of a method for operating a vehicle damper, the method including blocking a flow of fluid through a flow aperture of a valve within the vehicle damper until the fluid in the flow aperture reaches an opening pressure of the valve, and providing a variable orifice area for flow of fluid within the vehicle damper prior to the fluid in the flow aperture reaching the opening pressure of the valve.

A vehicle damper according to our invention may also include a cylinder tube defining a working chamber for containing a fluid therein, a reservoir tube defining a reservoir for supplying fluid to the working chamber, and a base valve assembly. The base valve includes a valve seat separating the working chamber from the reservoir and defining a flow aperture extending through the valve seat for providing fluid communication between the reservoir and the working chamber. The base valve also includes a flexible orifice disk and a support disk. The orifice disk has an outer periphery adapted for clamped engagement against the valve seat, and for blocking the flow aperture when the outer periphery of the flexible orifice disk is not deflected away from the valve seat, and a support disk adapted for clamping less than the entire outer periphery of the flexible orifice against the valve seat. The support disk is shaped for providing support of the flexible orifice disk against the valve seat such that fluid pressure within the flow aperture causes localized deflection in a direction away from the valve seat of an unsupported portion of the outer periphery the flexible orifice disk, with the deflected unsupported portion of the flexible orifice disk, and a portion of the valve seat adjacent to the deflected portion of the orifice disk, defining a bleed orifice having an area for bleed flow through the valve that is variable in accordance with the pressure of the fluid in the flow aperture prior to the fluid in the flow aperture reaching the opening pressure of the valve.

The foregoing and other features and advantages of our invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 4:
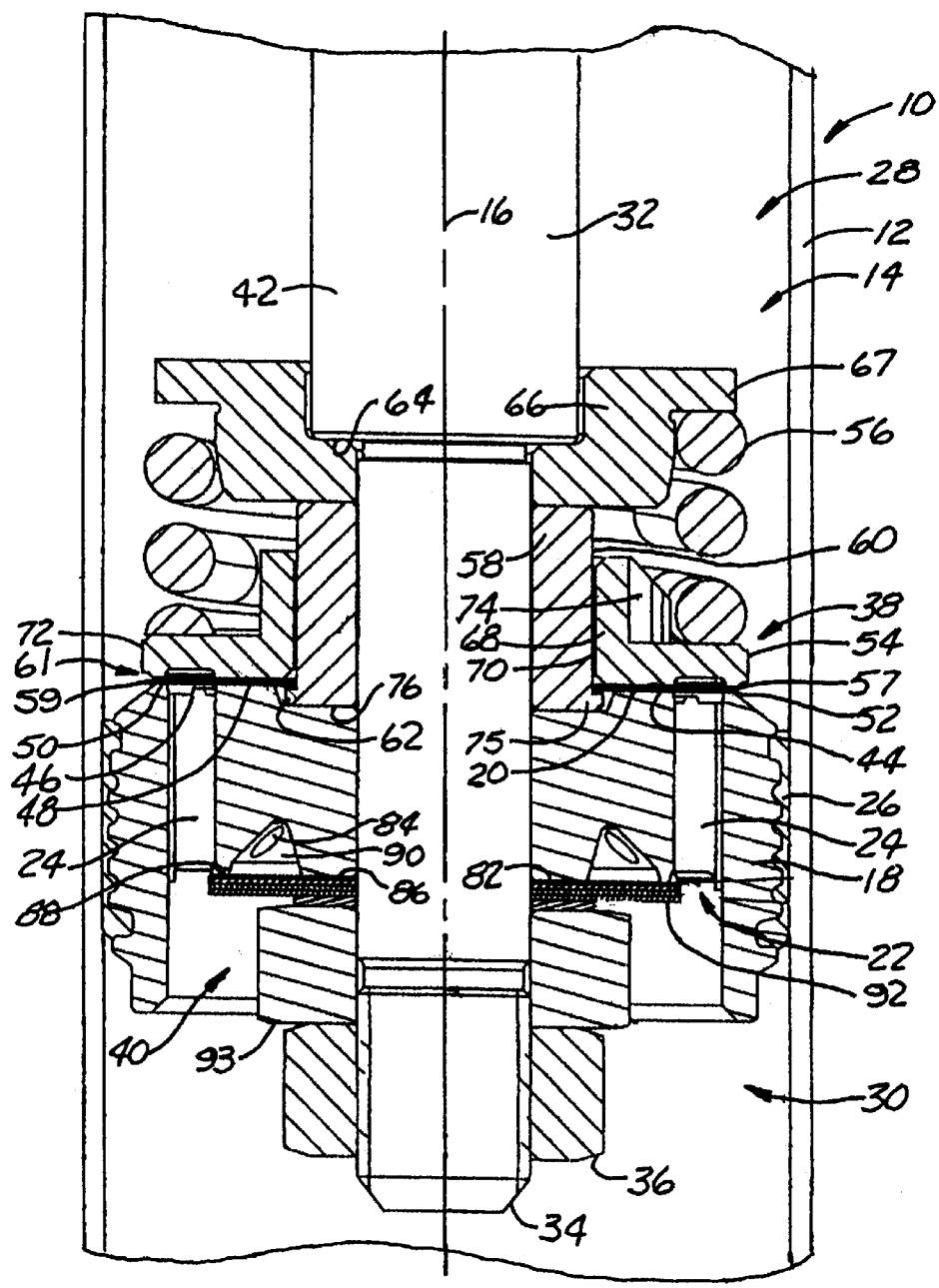
FIG. 4 is a cross-sectional view of an exemplary embodiment of a vehicle damper, having a compression valve in accordance with our invention.
Figure 5:
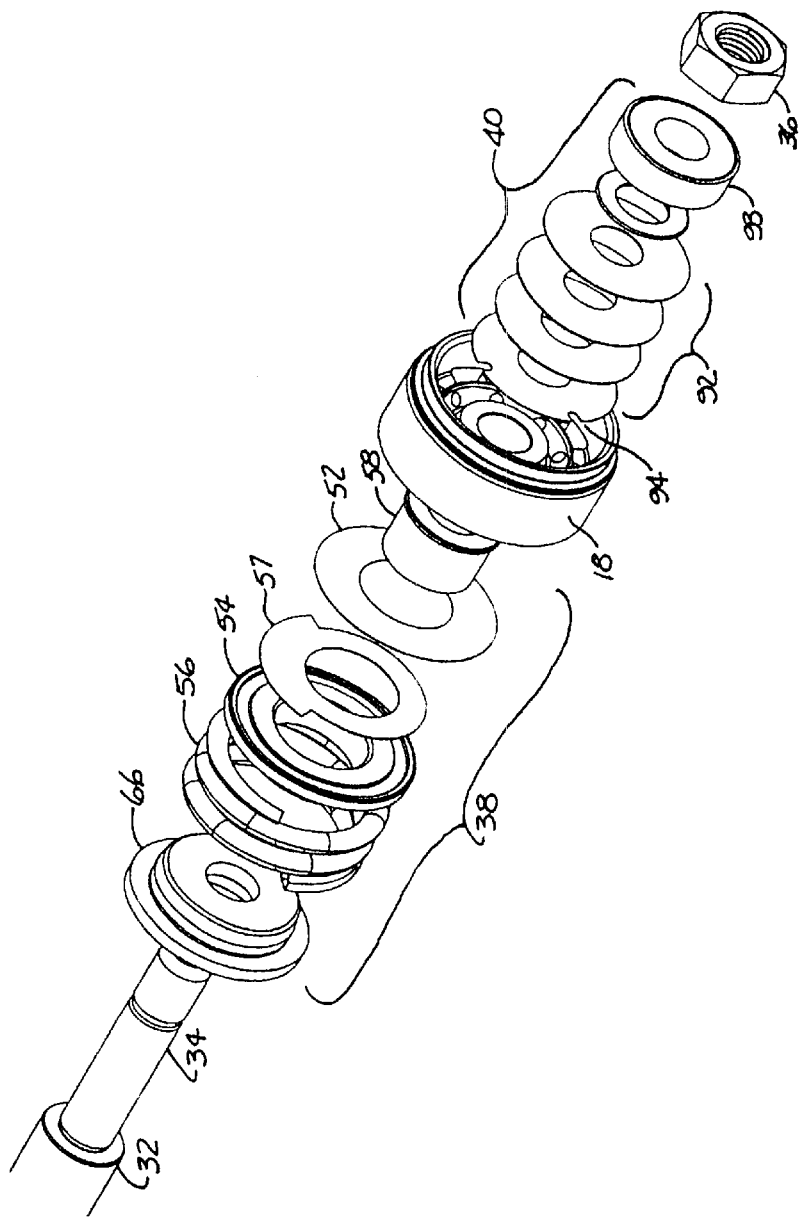
FIG. 5 is an exploded perspective view of the embodiment of FIG. 4.

FIGS. 4 and 5 depict a vehicle damper 10 according to our invention including a cylinder tube 12 defining a working chamber 14 for containing a fluid therein and defining an axis 16. A reciprocating piston 18 is slidably disposed in the working chamber 14. The piston 18 includes a first and a second face 20, 22 and flow apertures 24 extending through the piston 18 from the first to the second face 20, 22. The piston has a seal ring 26 on the outer circumferential surface for providing a sliding seal between the piston 18 and the cylinder tube 12, such that the piston divides the working chamber 14 into an upper portion 28 above the piston 18 and a lower portion 30 below the piston 18.

A piston rod 32 has a first end 34 extending through a bore in the piston 18, and connected to the piston 18 by a nut 36 that clamps the piston 18 and parts of a compression valve 38 and a rebound valve 40 to the piston rod 32 for linear movement of the rod 32 and piston 18 within the working chamber 14 along the axis 16. The second end 42 of the piston rod 18 extends along the axis 16 and out of the working chamber 14.

The compression valve assembly 38 has a valve seat 44 formed by the first face 20 of the piston 18, oriented substantially perpendicularly to the axis 16. The valve seat 44 could also be a separate part bonded to the piston 18. The valve seat defines one or more pressure cavities 46 in fluid communication with the flow apertures 24 extending through the piston 18. The valve seat 44 also defines an inner hub 48 and an outer hub 50 surrounding the pressure cavities 46.

Figure 6:
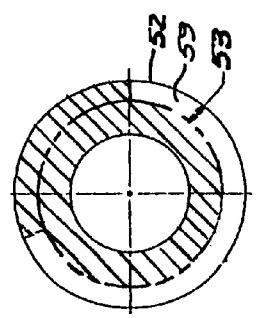
FIG. 6 shows unsupported peripheral portions of a variable orifice disk, according to our invention.
Figure 1:
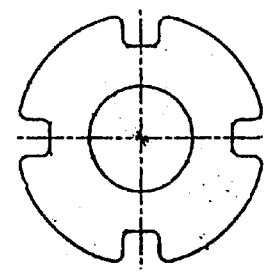
FIG. 1 shows a notched orifice disk of the type used in prior vehicle dampers to provide a constant area bleed orifice for low velocity inputs to the vehicle damper.
Figure 3:
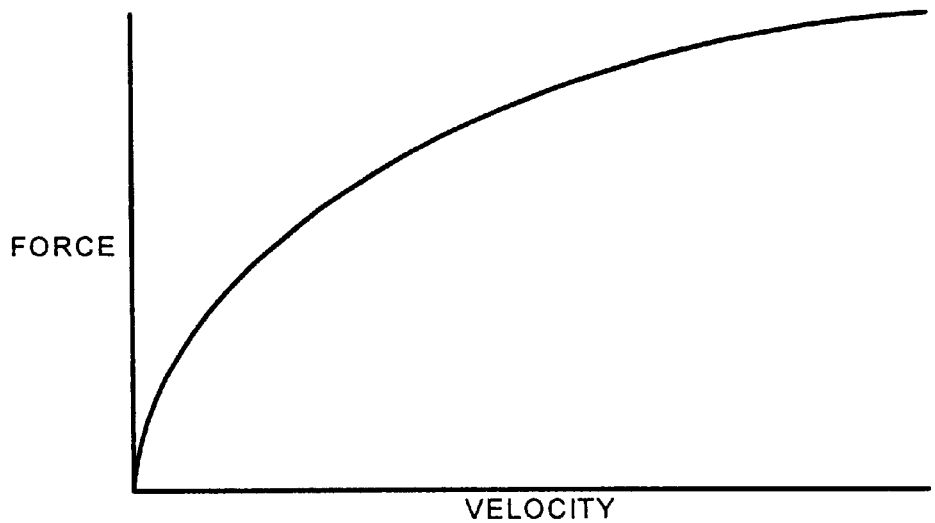
FIG. 3 is a graph illustrating a desired performance characteristic achieved in our invention, in a vehicle damper providing a force versus velocity relationship that digresses from the parabolic shaped performance characteristic produced in prior art dampers having a constant area bleed orifice for low velocity inputs.
Figure 2:
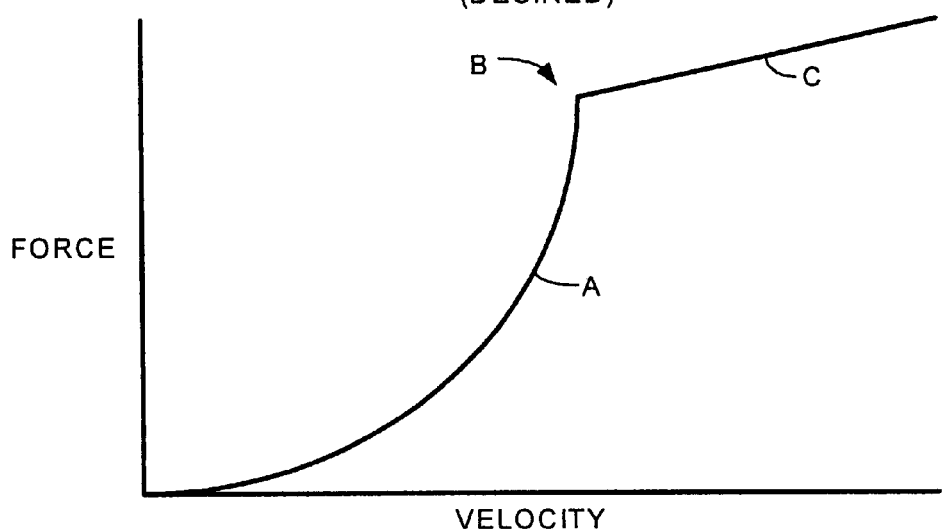
FIG. 2 is a graph illustrating the performance of a prior valve, in a vehicle damper, having a notched orifice disk of the type shown in FIG. 1.

The compression valve 38 further includes orifice disk means in the form of a floating flexible orifice disk 52 and a support disk 57. The orifice disk 52 has a simple 'washer like' shape. It is imperforate, and does not include the low speed bleed notches of orifice disks in prior valves, such as the one illustrated in FIG. 1. As shown in FIG. 6, the orifice disk 52 has an outer periphery 53, illustrated by the annular area outside of the dashed line in FIG. 6, adapted for clamped engagement against the outer hub 50 of the valve seat 44, and for blocking the flow aperture 24 when the outer periphery 53 of the flexible orifice disk 52 is not deflected away from the valve seat 44. The orifice disk means further includes a support disk 57 adapted for clamping less than the entire outer periphery 53 of the flexible orifice disk 52 against the valve seat 44.

Figure 7:
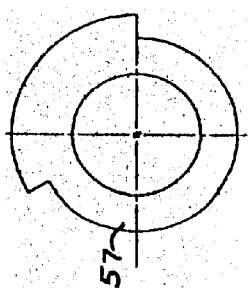
FIG. 7 shows an eared support disk that is coextensive with less than all of the peripheral area of the variable orifice disk shown in FIG. 6.

The support disk 57 is shaped as shown in FIG. 7 to be coextensive with less than the entire outer periphery, as shown by crosshatching in FIG. 6, for providing partial support of the flexible orifice disk 52 against the valve seat 44, in such a manner that fluid pressure within the flow aperture 24 and pressure cavity 46 causes localized deflection of an unsupported portion 59 of the outer periphery 53 of the flexible disk 52, in a direction away from the valve seat 44. The deflected unsupported portion 59 of the flexible orifice disk 52, and a portion of the valve seat 44 adjacent to the deflected portion 59 of the orifice disk 52, define a bleed orifice 61 having an area for bleed flow through the valve 38 that is variable in accordance with the pressure of the fluid in the flow apertures 24 prior to the fluid in the flow aperture 24 reaching the opening pressure of the valve 38.

A spring seat 54 is adapted for movement along the axis 16 and for clamping the orifice disk 52 between the support disk 57 and the valve seat 44.

In the embodiment depicted in FIGS. 4 and 5, a low rate/high preload precision wound helical spring 56 preloads the spring seat 54, support disk 57, and orifice disk 52 against the valve seat 44. We contemplate that such a spring 56, having characteristics suitable for use in a vehicle damper 10 according to our invention, would have a spring rate in the range of 20 to 60 Newtons per millimeter and develop a preload in the range of 100 to 500 Newtons, when installed in a valve as described herein. We contemplate that a suitable low rate high preload spring 56 might, for example, have a spring rate of approximately 45 Newtons per millimeter, and a preload of about 250 Newtons and above. We wish to specifically note, however, that our invention may also be used in embodiments having different types of springs, or springs that do not have low rates and high preloads.

A bushing 58 extends from the valve seat 44 along the axis 16, with the bushing 58 including a guide surface 60 for guiding the spring seat 54, the support disk 57, and the orifice disk 52 along the axis 16. The bushing 58 includes a flange 62 for clamping the spring 56 against the spring seat 54 when the bushing 58 is clamped between a shoulder 64 on the piston rod 32 and the valve seat 44. A spring retainer 66 extends along the axis 16 and includes a flange 67 for clamping the spring 56 against the spring seat 54, and the bushing 58 against the valve seat 44.

The spring seat 54 also includes a hub 68 extending upward from the seat 54. The hub 68 has an elongated inner bore 70 configured for keeping the spring seat 54 in sliding alignment with the guide surface 60 of the bushing 58. The spring seat 54 also has a radially extending flange 72, extending generally perpendicularly to the axis 16, for engaging the end of the spring 56, and an outer surface 74 extending into the spring 56 along the axis 16 from the flange 72 for engaging and centering the lower end of the spring 56. The flange 72 also guides the support disk 57 and the orifice disk 52 when they are floating off of the valve seat 44, and keeps the support disk 57 and the orifice disk 52 aligned properly in a generally perpendicular extending direction with respect to the axis 16 as the orifice disk 52 comes into contact with the valve seat 44, so that the orifice disk 52 does not become cocked or pinched during assembly and operation of the vehicle damper 10.

The guide surface 60 of the bushing 58 extends past the orifice disk 52 when the bushing 58 is clamped against the valve seat 44. The guide surface of the bushing 58, in the embodiment depicted in FIGS. 4 and 5, is a right circular cylinder, concentric with the axis 16, terminating in means for precluding the variable orifice disk 52 from separating from the bushing 58 prior to the bushing 58 contacting the valve seat 44, in the form of a flange 62 forming a cylindrical pilot 75 adapted to engage the valve seat 44.

The inner hub 48 of the valve seat 44 includes a piloting recess 76 for receipt of the cylindrical pilot 75 of the guide surface 60 extending past the orifice disk 52 when the bushing 58 is clamped against the valve seat 44. The piloting recess 76 in the valve seat 44 is configured for receiving and positioning the cylindrical pilot 75 radially and axially, with respect to the axis 16 and the valve seat 44. With the pilot 75 of the bushing 58 inserted and clamped into the piloting recess 76, the length of the bushing 58 between the pilot 75 and the spring retainer 66 limits the preload on the spring 56. Preferably, the guide surface 60 is long enough to extend past the orifice disk 52 into the piloting recess 76 prior to clamping up the compression valve assembly 38, so that the orifice disk 52 cannot be inadvertently clamped between the pilot 75 of the bushing 58 and the valve seat 44.

The outer periphery of the orifice disk 52 does not include slotted openings extending over the pressure cavities 46 and configured for allowing a restricted flow of fluid through the flow aperture 24 in the piston 18 and out of the pressure cavities 46 when the orifice disk 52 is clamped against the valve seat, as was the case in prior vehicle damper valves.

By varying the relative shapes of the orifice disk 52 and support disk 57 to give unsupported areas 59 of different size and shape, and by varying the thickness and material of the orifice disk 52 to change the flexibility of the orifice disk 52, a desired low velocity performance characteristic of the vehicle damper 10 can be achieved. The pressure at which the compression valve 38 will blow off can be preset by judicious selection of the preload and rate of the spring 56, and the areas of the orifice disk 52 exposed to the fluid pressure in the pressure cavities 46 when the orifice disk 52 is clamped against the valve seat 44 and operating in deflected low velocity mode. The high speed travel rate of the piston 18 in the working chamber 14 after blow-off has occurred is determined by the size and number of the flow apertures 24 extending through the piston 18.

In the embodiments depicted in FIGS. 4 and 5, the rebound valve 40 is a flexing disk valve of conventional notched orifice disk construction. The second face 22 of the piston 18 is configured to provide a second valve seat 82 and the piston 18 defines one or more second flow apertures 84 extending through the piston 18. The second valve seat 82 defines a second inner hub 86 and a second outer hub 88 surrounding one or more second pressure cavities 90 connected in fluid communication with the second flow apertures 84.

A series of flexible washers 92 are clamped against the second valve seat 82 by a retainer/spacer 93 having a radiused upper surface adjacent the flexing disks 92, and the nut 36. The outer periphery of the washer 92 closest to the second valve seat 82 includes notched openings 94 to allow a flow of fluid across the piston 18 during low speed rebound through the second flow apertures 84 and second pressure cavities 90. Fluid pressure transferred to the second pressure cavities 90 via the second flow apertures 84 causes the flexible washers 92 to flex away from the second valve seat 82 when the pressure exceeds a predetermined preload value set by the material, configuration and number of flexible disks 92 used in the rebound valve 40. As the washers 92 flex away from the second valve seat 82, the flow area through the rebound valve 40 is increased significantly, thereby allowing for less damping at high piston 18 speeds. The radius on the retainer/spacer 93 is judiciously selected to prevent over-flexing of the washers 92.

We contemplate that in some forms of our invention, it may be desirable to utilize a valve assembly according to our invention, as described above with regard to FIGS. 4 and 5, on the second face 22 of the piston and configured as a rebound valve, with some other form of a compression valve being used on the first face 20 of the piston 18. We further contemplate that in other forms of our invention, it may be desirable to utilize a valve assembly according to our invention on both faces 20, 22 of the piston, as shown in FIG. 8.

Figure 8:
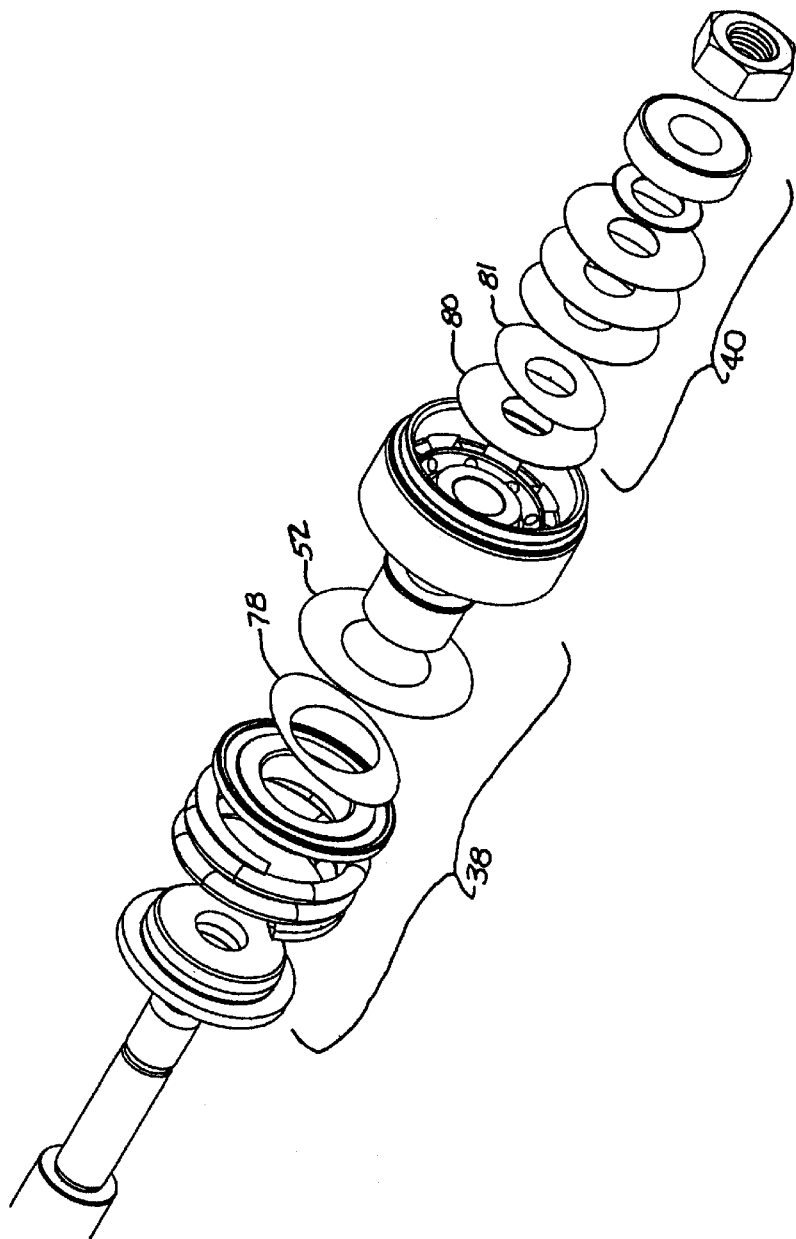
FIG. 8 is an exploded perspective view of a second exemplary embodiment of our invention having both a compression and a rebound valve in accordance with our invention.

FIG. 8 depicts an embodiment of our invention in which the compression valve 38 is constructed as a blow-off valve in the same manner as the embodiment described above in regard to FIGS. 4 and 5, except that the support disk 78 has an elliptical shaped periphery, rather than the eared periphery of the support disk 57 shown in FIGS. 4 and 5. The support disk 78 can have virtually an unlimited variety of outer periphery shapes, other than the eared and elliptical shapes shown in FIGS. 4 through 8. All that is required is that the support disk 78 not have a periphery that is co-extensive with the outer periphery of the orifice disk 52.

FIG. 8 also depicts a rebound valve 40, according to our invention, including a second imperforate flexible orifice disk 80 and a second elliptical shaped support disk 81, to provide a flexing disk valve having a variable area bleed orifice and a digressive force versus velocity operating characteristic of the damper 10 during low velocity rebound of the damper 10.

Figure 9:
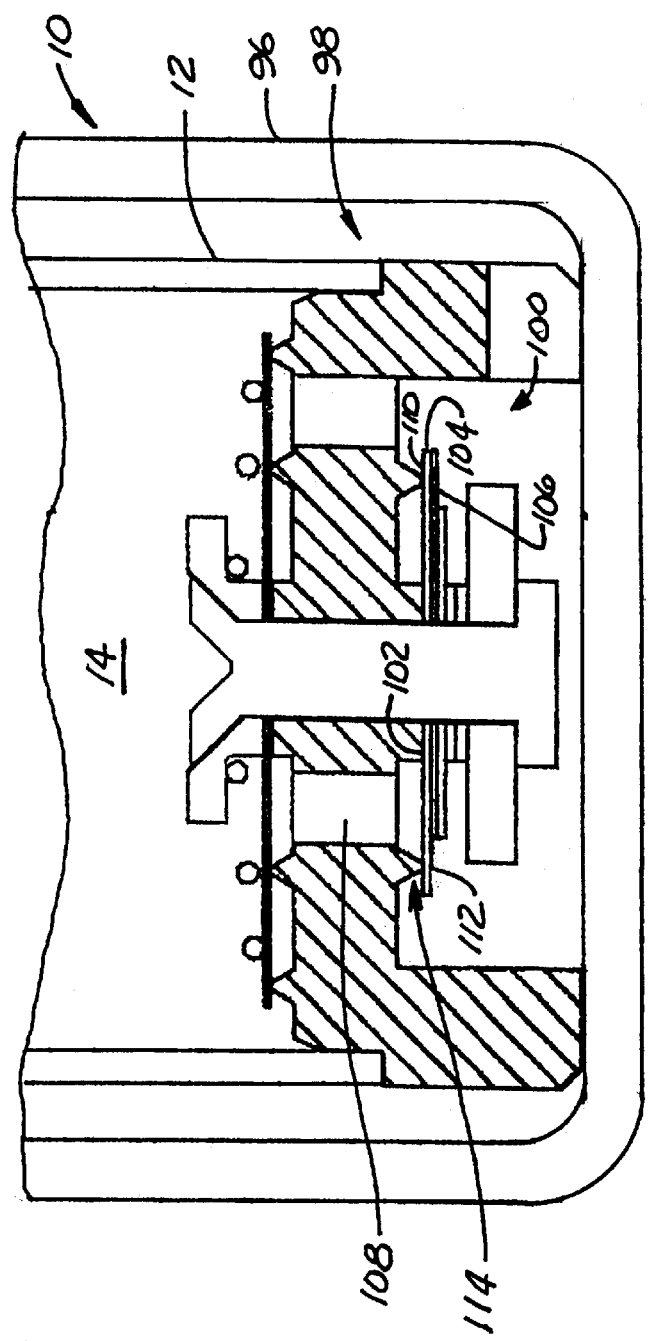
FIG. 9 is a cross sectional view of a vehicle damper having a base valve in accordance with our invention.

FIG. 9 depicts a dual tube vehicle damper 10 including a cylinder tube 12 defining a working chamber 14 for containing a fluid therein, a reservoir tube 96 defining a reservoir 98 for supplying fluid to the working chamber 14, and a base valve assembly 100.

The base valve assembly 100 includes a valve seat 102, a flexible orifice disk 104, and a support disk 106. The valve seat 102 separates the working chamber 14 from the reservoir 98 and defines a flow aperture 108 extending through the valve seat 102 for providing fluid communication between the reservoir 98 and the working chamber 14. The flexible orifice disk 104 has an outer periphery 110 adapted for clamped engagement against the valve seat 102, and for blocking the flow aperture 108 when the outer periphery 110 of the flexible orifice disk 104 is not deflected away from the valve seat 102. The support disk 106 is adapted for clamping less than the entire outer periphery 110 of the flexible orifice 104 against the valve seat 102. The support disk 106 is shaped for providing partial support of the flexible orifice disk 104 against the valve seat 102 such that fluid pressure within the flow aperture 108 causes localized deflection in a direction away from the valve seat 102 of an unsupported portion 112 of the outer periphery 110 the flexible orifice disk 104. The deflected unsupported portion 112 of the flexible orifice disk 104, and a portion of the valve seat 102 adjacent to the deflected portion of the orifice disk 104, define a bleed orifice 114 having an area for bleed flow through the valve 100 that is variable in accordance with the pressure of the fluid in the flow aperture 108 prior to the fluid in the flow aperture reaching the opening pressure of the base valve 100.

While the embodiments of our invention disclosed herein are presently considered to be preferred, various changes and modifications can be made without departing from the spirit and scope of the invention. The term "vehicle damper," as used herein, is intended to include, inter alia, structures known in the automotive or vehicle manufacturing industry as "shock absorbers," and "MacPherson struts."

The scope of the invention is indicated in the appended claims. We intend that all changes or modifications within the meaning and range of equivalents are embraced by the claims.

We claim:

1. A vehicle damper, comprising:
    a cylinder tube defining a working chamber for containing a fluid therein and defining an axis;
    a reciprocating piston slidably disposed in the working chamber and including a first and a second face and a flow aperture extending through the piston from the first to the second face;
    a piston rod having a first and a second end, the first end connected to the piston for linear movement of the rod and piston within the working chamber along the axis, the second end of the piston rod extending along the axis and out of the working chamber; and
    a valve assembly, having an opening pressure, and comprising:
        a valve seat oriented substantially perpendicularly to the axis and defining a pressure cavity in communication with the flow aperture extending through the piston;
        a flexible orifice disk that lifts away from the valve seat when the opening pressure of the valve is reached, the flexible orifice disk having an outer periphery adapted for clamped engagement against the valve seat and for blocking the flow aperture when the outer periphery of the flexible orifice disk is not deflected away from the valve seat,
        a support disk adapted for clamping less than the entire outer periphery of the flexible orifice against the valve seat, the support disk being shaped for providing support of the less than the entire outer periphery the flexible orifice disk against the valve seat such that fluid pressure within the pressure cavity below the opening pressure of the valve causes localized deflection in a direction away from the valve seat of an unsupported portion of the outer periphery the flexible orifice disk, the deflected unsupported portion of the flexible orifice disk and a portion of the valve seat adjacent to the deflected portion of the orifice disk defining a bleed orifice having an area for bleed flow through the valve that is variable in accordance with pressure of the fluid in the pressure cavity prior to the fluid in the pressure cavity reaching the opening pressure of the valve at which the support disk moves away from the valve seat, thereby allowing the orifice disk to lift off of the valve seat;
        a spring seat adapted for movement along the axis and for clamping the variable orifice disk between the support disk and the valve seat, and including a radially extending flange extending generally perpendicularly to the axis and adapted for bearing against the support disk;
        a spring for preloading the spring seat, support disk and the variable orifice disk against the valve seat;
        a bushing extending from the valve seat along the axis, the bushing including a guide surface, for guiding the spring seat, support disk and the orifice disk along the axis; and
        a spring retainer for clamping the spring against the spring seat and the bushing against the valve seat;
        the guide surface of the bushing extending past the variable orifice disk when the bushing is clamped between the spring retainer and the valve seat; and
        the valve seat including a piloting recess for receiving the portion of the bushing extending past the variable orifice disk when the variable orifice disk is clamped against the valve seat, the bushing thereby limiting the preload on the spring, and the portion of the bushing extending past the orifice disk and piloting recess thereby facilitating assembly of the vehicle damper by precluding the orifice disk from being inadvertently clamped between the bushing and the valve seat.

2. The vehicle damper of claim 1 wherein the portion of the bushing extending past the variable orifice disk terminates in means for precluding the variable orifice disk from separating from the bushing prior to the bushing contacting the piloting recess in the valve seat.

3. The vehicle damper of claim 2 wherein:
    the guide surface of the bushing is a right circular cylinder concentric with the axis and the means for precluding the variable orifice disk from separating from the bushing is a radially extending cylindrical pilot; and
    the piloting recess in the valve seat is configured for receiving and positioning the cylindrical pilot radially and axially with respect to the axis and the valve seat.

* * * * *